Nov. 15, 1949     E. W. TODD     2,487,955
BEDDER ATTACHMENT FOR TRACTORS

Filed Jan. 25, 1946     2 Sheets-Sheet 1

INVENTOR.
EVERETT W. TODD
BY
           ATTORNEY

Nov. 15, 1949     E. W. TODD     2,487,955
BEDDER ATTACHMENT FOR TRACTORS

Filed Jan. 25, 1946.     2 Sheets-Sheet 2

INVENTOR.
EVERETT W. TODD
BY
*A.S.Krob*
ATTORNEY

Patented Nov. 15, 1949

2,487,955

UNITED STATES PATENT OFFICE 2,487,955

BEDDER ATTACHMENT FOR TRACTORS

Everett W. Todd, Racine, Wis., assignor to The Massey-Harris Company, Racine, Wis., a company of Maryland Application January 25, 1946, Serial No. 643,391

8 Claims. (Cl. 97—47)

The present invention relates to a furrow opener, bedder or soil engaging device, adapted to be conveniently attached to a tractor, having a relatively short beam which is rigidly attached to a beam bracket. The beam bracket is pivotally mounted on spaced apart draw-bars or on a shaft which is secured to the rear ends of the drawbars, the front ends of the drawbars being horizontally pivoted at opposite sides of the tractor and the beam having spaced apart upwardly extending plates, the upper ends being pivoted to a push bar, the forward end of which is pivoted to the frame of the tractor so as to provide a parallel movement for raising and lowering the furrow opener.

In the drawings I have shown a single bedder attachment mounted on the rear of the tractor. It will be understood that two or more bedders may be attached to a tractor by means of a tool bar in which the same holding means is used for each bedder, whereby the bedders may be released independently.

In some tractor attachments tool bars are mounted on the forward or rear end of the tractor. It will be understood that my attachment or attachments may be secured to the tool bar when in either position.

My invention concerns the means for releasing the beam or beams when the furrow opener meets a serious obstruction and means for raising and lowering the device and for regulating depth. It will be understood that the friction means for releasing the beams is preferable because of its low cost; however a spring controlled means may obviously be used.

The present invention comprises a transverse pivotally mounted power lifting tube or shaft, having a suitable connection to a hydraulic or mechanical lift which receives power from the power mechanism of the tractor, there being a control lever for operating the lifting connection to my device, this connection having means for manually controlling the depth of the furrow opened.

An important feature of my invention is the means provided whereby if the opener meets a serious obstruction, the beam will be permitted to turn rearwardly and upwardly on a beam bracket as an axis thus to permit the furrow opener to clear the obstruction. The beam is held in its normal working position preferably by means of a suitable friction device.

An important object of the present invention is to provide a device which is strong, light and easily manufactured at low cost and easily attached to and easily detached from a conventional tractor.

To these and other useful ends my invention consists of parts, combinations of parts or their equivalents and mode of operation as hereinafter described and claimed and shown in the accompanying drawings in which:

Figure 2:
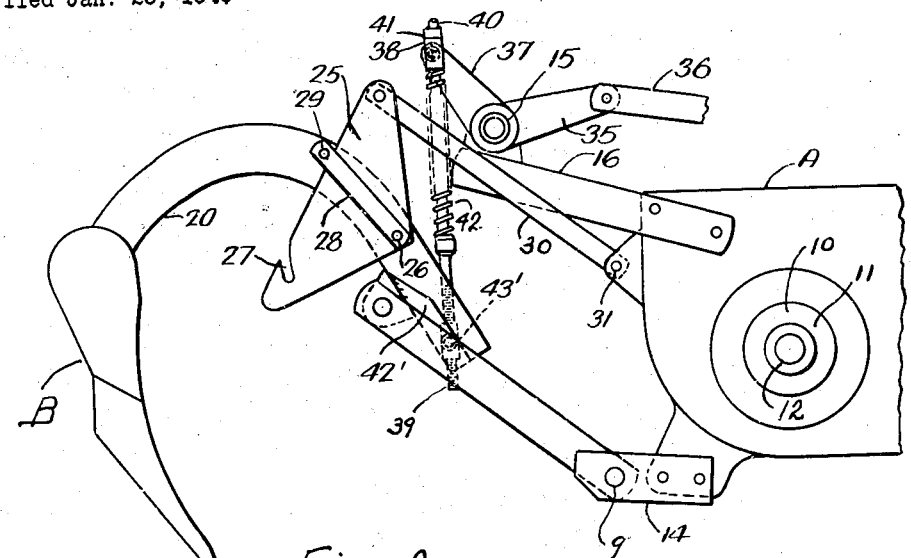
Fig. 2 is a side elevational view of the device shown in Figure 1, except after the furrow opener has met a serious obstruction and after the device has then been raised by the power lift.

As thus illustrated only a fraction of the tractor is shown which is designated by reference character A; the furrow opener in its entirety is designated by reference character B. Member A is conventional, the frame of which is designated by numeral 10, having outwardly projecting axle housings 11—11 through which extend axles 12—12, the ends protruding through member 11 and having mounted thereon rear ground wheels 13—13. The tractor is preferably provided with drawbar brackets 14—14 which are secured to opposite sides of the tractor frame 10 or to members 11. A power lift tube or shaft 15 is pivotally mounted on brackets 16—16 which are secured to opposite sides of housing 10.

I provide spaced apart drawbars 17—17 which are pivoted to the rear ends of members 14 as at 9, their rear ends being preferably rigidly connected together by means of a shaft 18. On this shaft and filling the space between members 17 I pivotally mount a beam bracket 19 to which a beam 20 is secured preferably by electric welding as at 21. The rear end of beam 20 is conventional in shape and being secured to member B at its lower end by means of suitable brackets as is the custom in devices of the class. On opposite sides of member 20 I secure triangularly shaped side plates 25—25 by means of a bolt 26, the rear ends of these plates being slotted as at 27.

Figure 1:
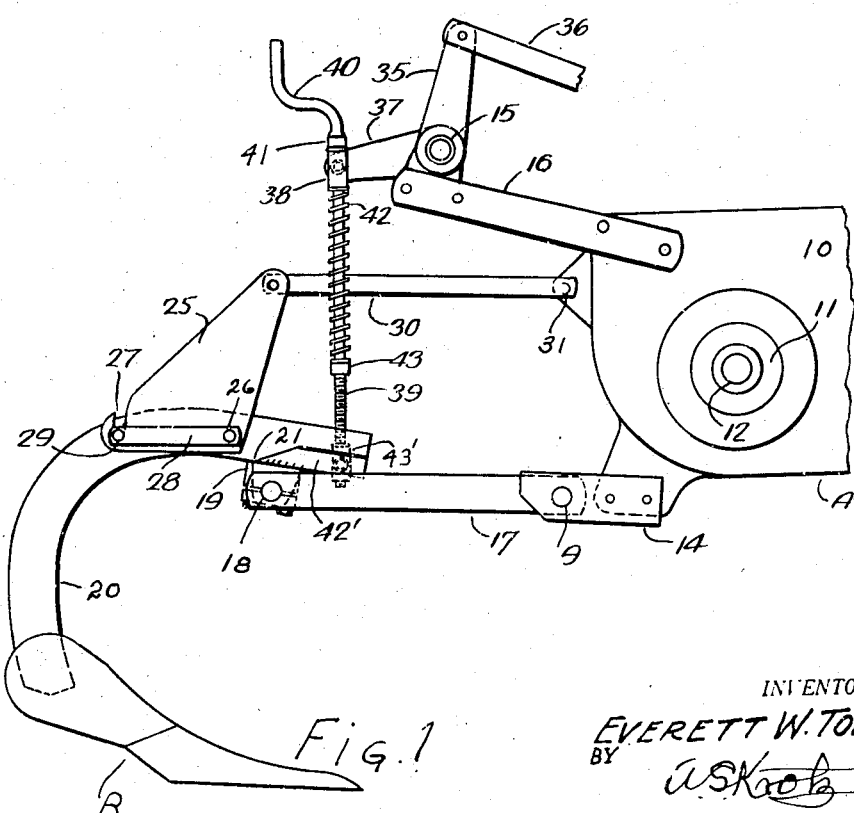
Fig. 1 is a side elevational view of my bedder attachment with the furrow opener in a working position and shown as attached to a conventional tractor, only a fraction of the tractor being shown.
Figure 3:
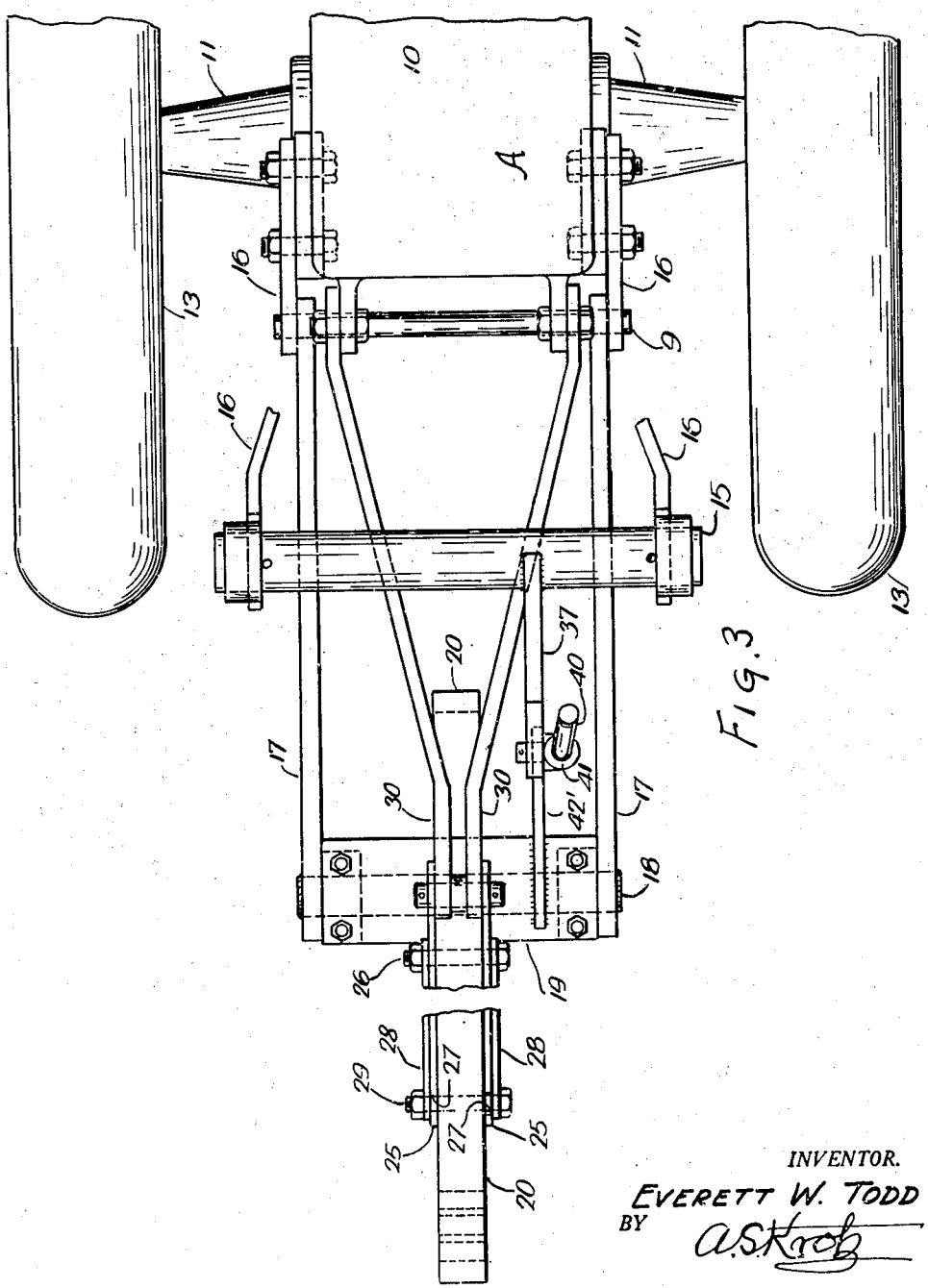
Fig. 3 is an enlarged top view of the device as shown in Figure 1, less the furrow opener.

I provide two straps 28 which lie on the outsides of members 25, bolts 26 extending through the front ends of these straps. The rear ends of members 28 and members 25 are bound to beam 20 by means of a bolt 29, the bolt laying freely in slot 27. Members 25 are shaped about as shown in Figures 1 and 2, their upper ends being pivotally connected to pressure links 30—30 which are at their forward ends pivoted to member 10 as at 31—31. Thus it will be seen by scrutinizing Figures 1 and 2 that a parallel movement is provided, that the beam and its fastenings to members 17 and 30 are raised and lowered by a parallel movement and that if member B meets a serious obstruction it may tilt upwardly on its axis 18 by overcoming the friction between the rear ends of members 25 and 20. After the beam has been released from its working position, all that is necessary to return it to a working position is to loosen bolt 29, member B will then return to its working position by gravity, after which bolt 29 may be again tightened.

Shaft 15 has a lever 35 secured thereto which is connected to the power lift of the tractor by link 36. Another lever 37 is secured to shaft 15 having rotatably mounted on its rear end a sleeve 38, the sleeve being adapted for the free reception of a shaft 39. The shaft at its upper end is preferably crank shaped as at 40 and having a collar 41 rigidly secured thereto, which normally rests on sleeve 38 because of spring 42 and collar 43, thus yieldingly holding collar 41 against sleeve 38. I secure an arm 42' at its rear end to beam bracket 19 preferably by electric welding. At the forward end of member 42' I rotatably mount a threaded sleeve 43' for the reception of the threads on member 39.

Thus it will be seen that the distance between members 38 and 43' may be changed by turning crank 40, thus to regulate the depth of the furrow and the entire mechanism may be raised by operating the power lift as illustrated in Figure 2; furthermore it will be seen that member 42' may raise relative to member 38 by overcoming spring 42.

It will be seen that collar 41 in its position determines the depth of the furrow plowed, but this depth position is yieldingly held downwardly by spring 42.

There are two advantages of spring 42, one is that the furrow opener may raise over a certain kind of obstruction without breaking the joint as already explained, by simply overcoming the pressure of spring 42. The other advantage is that the furrow opener need not immediately reach the depth determined by the position of lever 37 which is controlled by the power lift device. Thus if the power lift positively moves lever 37 downwardly no great strain will be put on the device if the furrow opener does not immediately reach its full depth or the depth determined by collar 41.

Clearly arm 42' may be dispensed with by pivoting sleeve 43' to the overhanging end of beam 20.

It will be seen that I have provided a very simple, easily operated, easily attached and detached device and a device which is protected against injury.

Having thus shown and described my invention I claim:

1. A bedder of the character described in combination with a tractor, comprising transversely spaced draw bars transversely hinged at their forward ends to the tractor, a rearwardly and downwardly extending beam hingedly connected at its front end to the rear ends of said draw bars, a forwardly extending member secured to said beam, a bedder secured to the rear lower end of said beam, its forward end being substantially on the vertical plane of the front end of said forwardly extending member, raising and lowering means associated with the tractor having a pivotal connection at its lower end to the forward end of said forwardly extending member with means adapted to raise and lower the bedder and manually determine the operating position of the bedder, triangularly shaped plates their lower ends positioned on opposite sides of said beam and being held thereto at their front corners by means of a bolt which extends through the beam and plates, a push element having its rear end pivotally connected to the upper ends of said plates, its forward end being pivoted to the tractor, the rear lower corners of said plates having open upper end slots therein, another bolt extending through said beam and said slots and adapted to frictionally hold the beam in normal working position but permit the beam to swing rearwardly and upwardly on said beam hinge as an axis and to turn on said first bolt as a hinge when the bedder meets a serious obstruction, whereby when the beam swings rearwardly and upwardly said bedder at its front end will swing rearwardly and upwardly.

2. A device as recited in claim 1 including, straps positioned on opposite sides of said plates through the ends of which said bolts extend.

3. A device as recited in claim 1 including, said raising and lowering means comprising a transversely positioned rotatably mounted shaft the bearings of which are mounted on the tractor and having an operating connection to the tractor, a generally rearwardly extending arm secured to said shaft, the connection between said arm and the front end of said forwardly extending member comprising a screw threaded shaft, a collar for limiting the downward movement of the shaft and a manually operated crank, whereby the shaft may be turned, and the working position of the bedder determined.

4. A device as recited in claim 1 including, said raising and lowering means having a spring with means which will permit the bedder to raise against the pressure of the spring.

5. A bedder of the character described in combination with a tractor, comprising transversely spaced draw bars transversely hinged at their forward ends to the tractor, a rearwardly and downwardly extending beam having its forward end hingedly connected to the rear ends of said draw bars, a bedder secured to the lower end of the beam, a forwardly extending member associated with said beam, raising and lowering means associated with the tractor and being pivotally mounted at its lower end to said forwardly extending member and having means whereby the vertical operating depth of said bedder may be manually determined, plates positioned on opposite sides of said beam, their lower front corners being pivotally secured to the beam, a push bar hingedly connected to the upper ends of said plates and being pivoted to the tractor a distance above the transverse plane of the front end of said draw bars, the rear lower corner of said plates having open upper end slots therein, the slots being substantially on a radius with said first bolt, another bolt extending through said beam and slots and adapted to frictionally hold the beam in normal working position but permit the beam to swing rearwardly and upwardly on said first bolt and on said beam hinge as axes, when the bedder meets a serious obstruction, the forward end of said bedder being substantially on the vertical plane of the forward end of said forwardly extending member, whereby when the beam swings rearwardly and upwardly said bedder at its front end will swing rearwardly and upwardly.

6. A bedder of the character described in combination with a tractor, spaced apart draw bars hingedly connected at their forward ends to the tractor and being connected together at their rear ends by means of a transverse shaft, a beam bracket hingedly mounted on said shaft, a beam secured to said beam bracket and extending rearwardly and downwardly and having mounted on its lower end a bedder, triangularly shaped plates positioned on opposite sides of said beam and being pivotally held thereto at their lower front corners by means of a bolt, a push bar, its rear end being hinged to the upper corners of said plates and at its forward end to the tractor a distance above the transverse plane of the forward end of said draw bars, the rear lower corners of said plates having downwardly extending open upper end slots, another bolt extending through said beam and slots whereby said last bolt may be made tight enough to hold the beam in working position except when the bedder meets a serious obstruction whereby the lower end of said beam will be permitted to swing rearwardly and upwardly on said first bolt and on said shaft as axes, a forwardly extending member secured to said beam bracket, means associated with said tractor having a hinged connection to the forward end of said forwardly extending member, the forward end of said bedder being substantially on the vertical plane of the hinge connection to said forwardly extending member, whereby said bedder may be raised and lowered from an operating to an inoperating position and whereby the beam may swing rearwardly and upwardly on said hinge connection as an axes.

7. A bedder of the character described in combination with a tractor, comprising transversely spaced draw bars transversely hinged at their forward ends to the tractor, a rearwardly and downwardly extending beam hingedly connected at its forward end to the rear ends of said draw bars, a bedder secured to the lower rear end of said beam, a forwardly extending member secured to the forward end of said beam, raising and lowering means associated with the tractor having a pivotal connection at its lower end to the forward end of said forwardly extending member and adapted to determine the vertical position of said bedder, triangularly shaped plates their lower ends positioned on opposite sides of said beam and being held thereto at their lower front corners by means of a bolt which is positioned adjacent said hinge, a push element having its rear end pivotally connected to the upper ends of said plates, its forward end being pivoted to the tractor a distance above the transverse plane of the forward ends of said draw bars, the rear lower corners of said plates having open upper end slots therein, another bolt extending through said beam and slots and adapted to frictionally hold the beam in normal working position but permit the beam to swing rearwardly and upwardly on said first bolt and said beam hinge as axes when the bedder meets a serious obstruction, the forward end of said bedder being on the vertical plane of said raising and lowering hinge, whereby when the beam swings rearwardly and upwardly said bedder at its front end will swing rearwardly and upwardly on said pivotal connection as an axis.

8. A bedder of the character described in combination with a tractor, comprising draw bars having their forward ends hinged to the tractor, a rearwardly and downwardly extending beam hingedly connected at its forward end to the rear ends of the draw bars, a bedder secured to the lower rear end of said beam, a forwardly extending member associated with the forward end of said beam, its forward end being a distance from said hinge and substantially on the vertical plane of the forward end of said bedder, triangular plates positioned on opposite sides of said beam their lower front corners being hinged to the beam, a push bar hinged to the upper corners of said plates, its forward end being hinged to the tractor, a bolt extending through said beam a distance in rear of said first bolt and adapted to normally frictionally hold the beam in working position but permit the beam to swing rearwardly and upwardly on its pivot to said draw bars and on said first bolt as axes, means associated with the tractor having a pivotal connection to the forward end of said forwardly extending member and having means to raise and lower the bedder and for manually determining the operating position of the bedder, whereby when said beam swings rearwardly and upwardly the front end of said bedder will swing rearwardly and upwardly on said pivotal connection as an axis.

EVERETT W. TODD.

REFERENCES CITED

The following references are of record in the file of this patent:

UNITED STATES PATENTS

| Number | Name | Date |
| --- | --- | --- |
| 211,098 | Knowlton | Jan. 7, 1879 |
| 2,302,502 | Morkoski | Nov. 17, 1942 |
| 2,410,860 | Bell | Nov. 12, 1946 |